April 25, 1967 TSUNEO KUZUOKA ETAL 3,316,064
APPARATUS FOR CONTINUOUS POLYCONDENSATION REACTION
Filed April 30, 1964 2 Sheets-Sheet 1
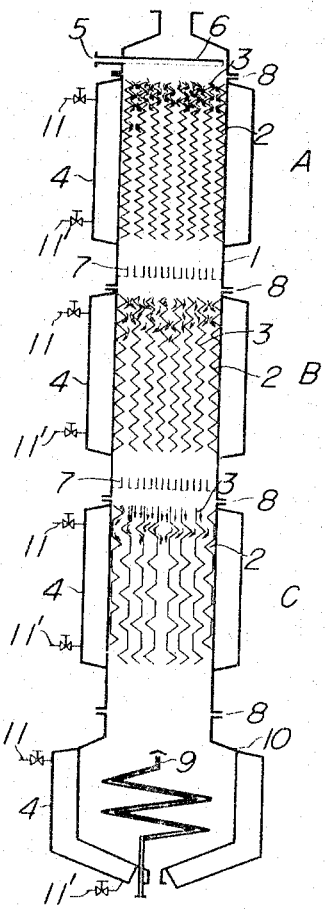
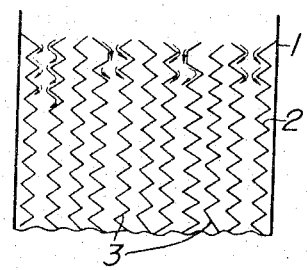
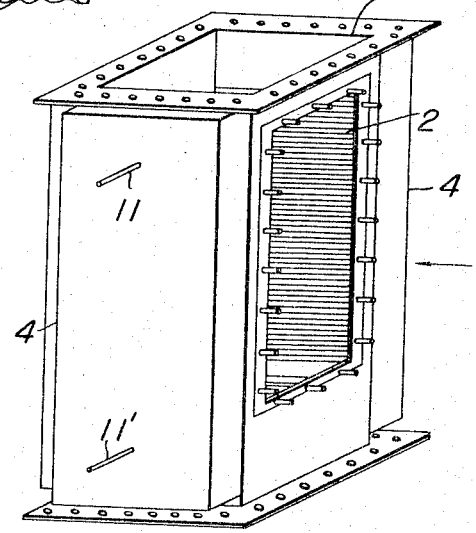
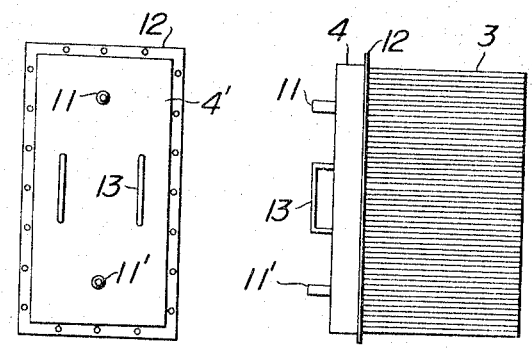
INVENTORS
Tsuneo Kuzuoka
Seiichi Kikkawa
Hiroshi Murayama
By Paul M. Craig Jr.
ATTORNEY

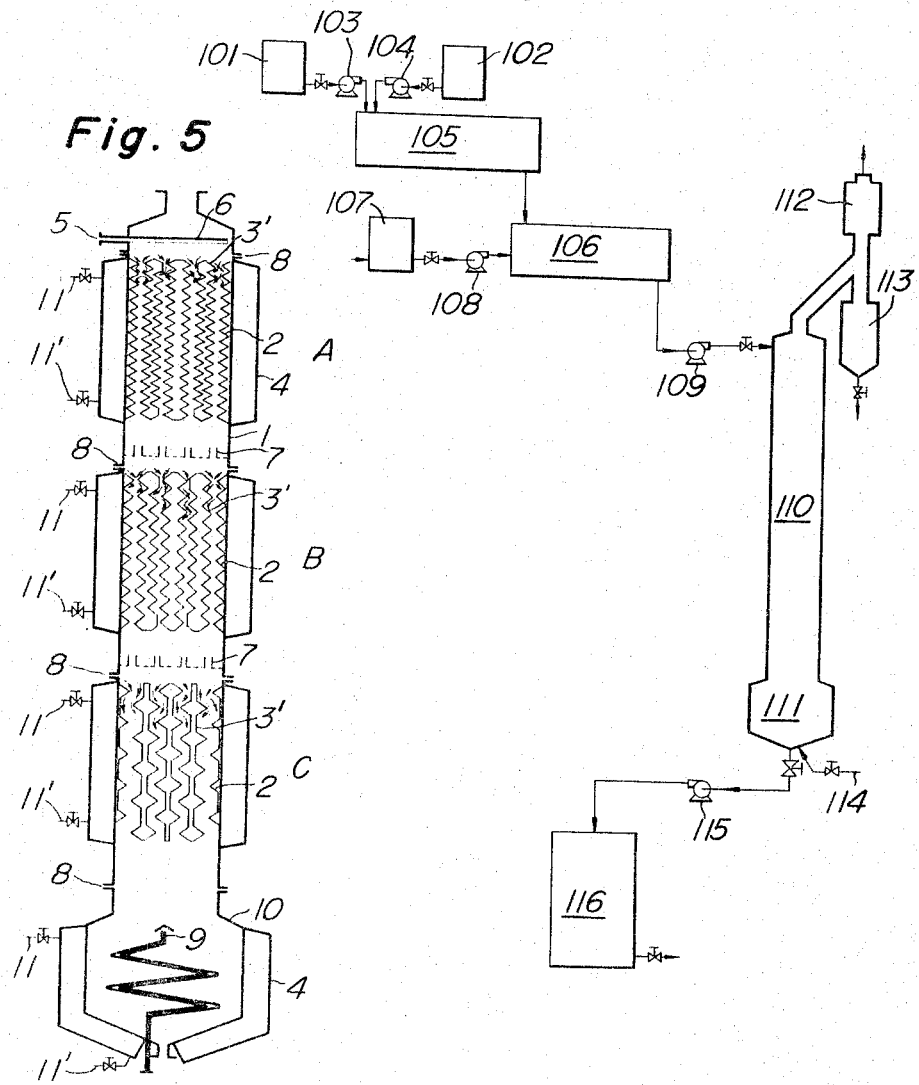

3,316,064
APPARATUS FOR CONTINUOUS POLYCONDENSATION REACTION

Tsuneo Kuzuoka, Tokyo, and Seiichi Kikkawa, and Hiroshi Murayama, Hitachi-shi, Japan, assignors to Hitachi, Ltd., Tokyo, Japan, a corporation of Japan
Filed Apr. 30, 1964, Ser. No. 363,899
17 Claims. (Cl. 23—283)

This invention relates to reaction apparatus adapted for continuously effecting polycondensation reaction.

For example, in manufacturing alkyd resins (by synthesis), the liquid reaction materials have lower viscosities at the initial stage of esterification and condensation byproducts are formed in considerably large quantities. Under these circumstances, in order to minimize the reaction time, various conditions must be met including use of a highest allowable reaction temperature not exceeding the decomposition point of the reaction materials, increase in the free surface area of the reaction materials or their area of contact with the gaseous phase, and accelerated removal of the condensation by-products formed in the reaction.

As is well known, conventional types of poly-condensation reaction apparatus of the batch type generally consist of an agitator, a condenser, heating coils, jacket means, an opening for introducing reactant materials, and an opening for discharging the product. These batch type apparatus have encountered many deficiencies, including a difficulty in obtaining uniform products, limited handling capacity per unit volume, substantial loss of time in operation, and waste of auxiliary materials including heat loss in the heating and cooling processes.

The present invention eliminates these deficiencies and has for its primary object an improved apparatus which has an increased rate of heat transfer to rapidly heat the reaction materials to the desired reaction temperature. The present apparatus also exhibits an increased rate of removal of the by-products formed in the reaction so that the desired polycondensation reaction can be carried out continuously and at a high rate.

A corollary object of the present invention is to provide an improved apparatus capable of performing the desired polycondensation reaction in a continuous fashion and with an improved efficiency.

Other objects and advantages of the present invention will be apparent from the following description when taken in conjunction with the accompanying drawings, which schematically illustrate some embodiments of the invention.

According to the present invention, an apparatus for continuous polycondensation reaction is provided which is designed to satisfy all of the above pointed-out conditions and comprise one or more reaction units connected with each other and each including a vertically arranged reaction vessel having corrugated inner wall surfaces and filled with packings which have corrugated surfaces and are arranged to allow the liquid reaction materials to flow down through the vessel.

In the drawings:

FIG. 1 is a schematic fragmentary cross-sectional view illustrating the principle of the reaction apparatus of the present invention;

FIG. 2 is a vertical cross-sectional view of an apparatus for continuous polycondensation reaction constructed according to the present invention.

FIG. 3 illustrates a header used in each reaction stage in front and side elevations with corrugated packings affixed to the header;

FIG. 4 is a perspective view of the vessel structure in which the packings of FIG. 5 are fitted;

FIG. 5 is a view similar to FIG. 2 showing another embodiment of the present invention employing hollow corrugated packings; and FIG. 6 is a block diagram of the entire arrangement of the apparatus according to the present invention, showing the process of manufacturing polycondensates.

Referring first to FIG. 1, description will be made on the principle on which the present invention is based. In FIG. 1, the hollow vertically arranged reaction vessel 1 has corrugated inner wall surfaces 2 with corrugated packings filled in the vessel. Liquid reaction materials fed at the top of the reactor 1 flow down while reacting along the corrugated packings 3 and the corrugated inner wall surfaces of the reaction vessel, as indicated by the arrows. The arrangement also includes heating means.

The apparatus of the present invention has the following advantageous features. Firstly, it has an improved rate of heat transfer to the liquid reaction materials, which flow down along the packings on one hand and the corrugated wall surfaces of the vessel on the other hand together forming an extended area of heat transfer. Secondly, since the reaction materials flow down forming thin films over the corrugated packing and vessel wall surfaces, the ratio of the free surface area of the materials or the area of their contact with the gaseous phase to their volume, can be made high to expedite the removal of the by-products formed in the polycondensation reaction. Thirdly, the loss in pressure, due to the presence of the packings, and the solvent vapor or inert gas blown into the bottom and/or side of the reaction apparatus is limited, minimizing the power requirement for blowing solvent vapor or inert gas therein. Finally, since the heat transfer to the reaction materials and the removal of the reaction by-products can be effected with efficiency, the apparatus functions to enable the desired reaction to proceed with rapidity.

These characteristics of the inventive apparatus will be apparent from the comparison between conventional batch type reactors and the inventive apparatus schematically illustrated in FIG. 1.

A practical embodiment of the invention is shown in FIGS. 2 to 4.

In FIG. 2, which represents a vertical crosssection of the embodiment, the hollow vertical type reaction vessel 1 has corrugated inner wall surfaces 2 and is filled with corrugated packing plates 3. Heating jackets 4 are formed about the periphery of the vessel outside thereof. An inlet opening 5 for liquid reaction materials is provided at the top of the vessel and connected with the inlet opening is a distributor pipe 6 for distributing the reaction materials over the cross section of the vessel. As illustrated, the vessel is divided into three unit sections A, B and C lying one over another and a receiver tank section 10 lying at the bottom, all the sections being interconnected by flange means 8. The top and intermediate sections each include a redistributing device 7 arranged in the bottom for further distributing the liquid reaction materials midway of the vertical vessel. A sparger 9 is arranged in the bottom and/or side of the vessel. Conduits 11 and 11' are connected to each of the jackets 4 of the vessel to circulate an appropriate heating medium through the jacket.

Each of the reaction units A, B and C includes a corrugated inner wall surface 2 and is covered with a heating jacket 4, through which a heating medium is circulated. Corrugated packing plates 3 are arranged in the interior of each of the unit sections. The three unit section A, B and C are connected with each other in a vertical series by flange means 8, as described above, to form a reactor column 1. At the top of the column are arranged an inlet opening 5 and a distributor pipe 6 and at the column bottom a sparger 9 for blowing in solvent vapor or inert gas and an opening for removal of the polycondensation product.

Each of the unit reaction sections are filled with corrugated packing plates 3 by a method as illustrated in FIGURES 3 and 4.

In FIGURE 3, the corrugated packing plates 3 are affixed to a header 12 by welding, clamping or other means. The header 12 is formed integral with the jacket 4, which carries hand grips 13. The heating medium is introduced into and discharged from the jacket 4 through ports 11 and 11' to circulate through the heating jacket. The integral assembly including jacket 4, header 12 and packing plates 3 is adapted to be fitted in the column section in the direction indicated by the arrow in FIGURE 4 to complete the reaction section.

In FIGURE 4, reference numeral 1 denotes the reaction vessel; 2 the corrugated inner wall surface of the reaction vessel; 4 heating jackets; and 11, 11' openings for introducing and discharging the heating medium into and from the jackets.

In operation of the apparatus shown in FIGURES 2 to 4, the liquid reaction materials subjected to an appropriate pre-treatment are introduced into the column through inlet opening 5, formed in the top of the column and dispersed by the distributing pipe 6 to flow down along the corrugated packing plates 3 and the corrugated inner wall surfaces of the column, as indicated by the arrows in FIGURE 2. The reaction materials in liquid form, being heated by the heating medium circulating through the heating jackets 4, undergo reaction on the surface of the packing plates and the inner walls of the vessel while forming condensation by-products and collect in the redistributing device 7 arranged in the bottom of the unit reactor structure A to flow down through perforations in the device 7 thus to be distributed into the intermediate reactor section B, in which the reaction materials undergo reaction while flowing down through the section B in just the same manner as in section A. Leaving the section B, the materials enter the lowermost reactor section C and react while flowing down therethrough again in the same manner as described in connection with section A to complete the entire reaction process. The polycondensation product formed collects in the column bottom and is removed out of the apparatus through the bottom discharge opening.

In this manner, the polycondensation reaction is effected continuously and the by-products formed in the process is separated from the liquid in the form of vapor immediately after their formation to rise through the spaces in the column together with the solvent vapor or inert gas blown therein by sparger 9, arranged in the column bottom and is led quickly to the recovering section of the apparatus.

With this reaction apparatus, a heating medium such as steam or heated liquid is circulated through the heating jackets for the purpose of heating the reaction materials in liquid form, as described hereinbefore. Moreover, the liquid reaction materials flow down through the successive reactor sections while undergoing reaction. In this process, the reaction materials may have a substantially increased viscosity particularly in the intermediate and final stages. To meet this situation, the inner walls of the lower reactor sections and the packing plates therein may conveniently be corrugated to a slightly lesser extent or have a reduced number of ridges and furrows compared to those in the top stage thereby to properly control the flow velocity.

Instead of employing the heating jackets, use may be made of heating means of blowing into the apparatus heated steam or other gaseous fluid through the sparger 9, which is arranged in the column bottom.

In addition to serving the above-purpose, it is to be noted that the sparger 9 is provided to blow in therethrough an appropriate solvent vapor or inert gas for the purpose of expediting the removal of the by-products formed in the polycondensation reaction and also of preventing the materials from being colored by their contact with air.

With the apparatus of the present invention, the number of unit reaction sections and the corrugated structure of each of such sections may be determined as desired depending upon the extent of reaction and the amount of the polycondensation product formed. For example, the corrugations of the inner wall surfaces 2 of each of the unit reactor sections and the corrugated packings arranged therein may include ridges and furrows of any desired angle of slope and pitch. Also, the number of the corrugated packings in each of the unit sections may be freely selected to meet the intended purpose.

FIGURE 5 illustrates a modified embodiment of the present invention which employs an improved form of corrugated packings effective to render the apparatus more efficient. In FIGURE 5, where the same references have been used as in FIGURES 2 to 4 for similar parts, reference numeral 3' indicate hollow packings having corrugated surfaces. Through the hollows of the corrugated packings 3' is circulated a heating medium for heating the liquid reaction materials. By this means, it will be apparent that the materials can be heated with increased efficiency to accelerate the reaction. As observed, the apparatus has the same construction as the one shown in FIGURES 2 to 4, except for the packing structure.

By employing the inventive apparatus as illustrated in FIGURES 2 to 5, the polycondensation reaction can be effected in a continuous fashion to form the desired product continuously, as will be described below in further detail with reference to FIGURE 6, which schematically illustrates the entire process effected with the inventive reaction apparatus.

In FIGURE 6, reference enumerals 101 and 102 indicate material storage tanks equipped with pumps 103 and 104, respectively. Reference numeral 105 indicates an apparatus for continuously effecting ester-interchange for the polycondnesation reaction. Reference numeral 107 indicates a vessel for treating materials equipped with a pump 108, which is connected with an apparatus 106 for effecting the next half-esterification in a continuous manner. Reference numeral 110 indicates a reaction apparatus according to the present invention connected with the apparatus 106 by way of a pump 109 and including a receiver tank 111. Connected with the reaction apparatus 110 is a condenser 112 with a condensate receiver tank 113. A conduit 114 communicates with the sparger provided in the reaction apparatus 110. Also connected with the reaction apparatus 110 is a dissolving tank 116 by way of a pump 115 for withdrawing the reaction product from the reaction apparatus.

Materials for the ester-interchanging reaction, pretreated into liquid form, are fed from the storage tanks 101 and 102 into the continuous ester-interchanging unit 105 by way of pumps 103 and 104 and thence introduced into the continuous half-esterification unit 106, where they are joined with another material treated into liquid form in the tank 107 and are subjected to half-esterification. The liquid reaction material thus prepared is delivered by pump 109 into the reaction column 110 through the inlet opening formed in the top thereof and flows down therethrough while undergoing reaction. During the reaction, it is noted that an appropriate gas such as carbon dioxide gas is led into the column 110 through the conduit 114. The polycondensation product thus formed collects in the receiver tank 111 provided in the column bottom while the reaction by-products are condensed in the condenser 112 of the recovery section and collect in the receiver tank 113 for removal.

The reaction product collecting in the receiver tank 111 is transferred by pump 115 into the dissolution tank 116. It will be understood that pumps such as indicated at 103, 104, 108, 109 and 115 are provided as required.

Additionally, though the apparatus illustrated has a rectangular transverse cross section as observed in FIGS. 3 and 4, the inventive apparatus may be modified to take the form of a cylindrical column maintaining the same functional effects.

Further modifications of the structure herein disclosed may suggest themselves to those skilled in the art, and it is to be understood that the present disclosure relates to a few embodiments of the present invention which are given by way of example only and not to be narrowly construed.

What is claimed is:

1. An apparatus for continuous polycondensation comprising a reaction vessel having at least one reaction unit, an inlet provided at the top of said reaction vessel for introducing reactant material into said reaction vessel, an outlet provided at the bottom of said reaction vessel for discharging the products of polycondensation, heating means encompassing substantially the outer periphery of each of said reaction units, packing disposed in said reaction unit substantially parallel to the inner walls of said reaction unit, both the inner surfaces of said reaction unit and said packing having corrugated surfaces which are exposed to contact with the reactants, a header attached to said packing and having associated therewith a heat exchange means, at least one reaction material redistribution means disposed between said inlet and said outlet, a sparger provided in the lowermost portion of said reaction vessel, a half-esterification unit communicating with said inlet and condenser means communicating with the top of said reaction vessel.

2. The apparatus of claim 1, wherein said packing is corrugated plates.

3. The apparatus of claim 1, wherein the corrugated wall surfaces of said reaction vessel are hollow to permit passage of a heating medium therethrough.

4. An apparatus for continuous polycondensation comprising a reaction vessel having at least one reaction unit, an inlet provided at the top of said reaction vessel for introducing reactant material into said reaction vessel, an outlet provided at the bottom of said reaction vessel for discharging the products of polycondensation, heating means encompassing substantially the outer periphery of each of said reaction units, packing disposed in said reaction unit substantially parallel to the inner walls of said reaction unit, both the inner surfaces of said reaction unit and said packing having corrugated surfaces which are exposed to contact with the reactants, a header attached to said packing and having associated therewith a heat exchange means, at least one reaction material redistribution means disposed between said inlet and said outlet, a sparger provided in the lowermost portion of said reaction vessel, a half-esterification unit communicating with said inlet, a dissolution tank communicating with said discharge outlet and condenser means communicating with the top of said reaction vessel.

5. The apparatus of claim 4, wherein said packing is corrugated plates.

6. The apparatus of claim 4, wherein the corrugated wall surfaces of said reaction vessel are hollow to permit passage of a heating medium therethrough.

7. An apparatus for continuous polycondensation comprising a reaction vessel having at least one reaction unit, an inlet provided at the top of said reaction vessel for introducing reactant material into said reaction vessel, an outlet provided at the bottom of said reaction vessel for discharging the products of the polycondensation, heating means encompassing substantially the outer periphery of each of said reaction units, packing disposed in the reaction unit substantially parallel to the inner walls of said reaction unit, both the inner surfaces of said reaction unit and said packing having corrugated surfaces which are exposed to contact with the reactants, the angles of the ridges of said corrugated surfaces increasing from the inlet to the outlet of said reaction vessel, a header attached to said packing and having associated therewith a heat exchange means, at least one reaction material redistribution means disposed between said inlet and said outlet, a sparger provided in the lowermost portion of said reaction vessel, a half-esterification unit communicating with said inlet, a dissolution tank communicating with said discharge outlet and condenser means communicating with the top of said reaction vessel.

8. The apparatus of claim 7, wherein said packing is corrugated plates.

9. The apparatus of claim 7, wherein the corrugated wall surfaces of said reaction vessel are hollow to permit passage of a heating medium therethrough.

10. The apparatus of claim 7, wherein the ridges and furrows of the corrugated surfaces decrease in number from the inlet to the outlet of said reaction vessel.

11. An apparatus for continuous polycondensation comprising a reaction vessel having at least one reaction unit, an inlet provided at the top of said reaction vessel for introducing reactant material into said reaction vessel, an outlet provided at the bottom of said reaction vessel for discharging the products of the polycondensation, heating means encompassing substantially the outer periphery of each of said reaction units, packing disposed in the reaction unit substantially parallel to the inner walls of said reaction unit, both the inner surfaces of said reaction unit and said packing having corrugated surfaces which are exposed to contact with the reactants, the ridges and furrows of said corrugated surfaces decreasing in number from the inlet to the outlet of said reaction vessel, a header attached to said packing and having associated therewith a heat exchange means, at least one reaction material redistribution means disposed between said inlet and said outlet, a sparger provided in the lowermost portion of said reaction vessel, a half-esterification unit communicating with said inlet, a dissolution tank communicating with said discharge outlet and condenser means communicating with the top of said reaction vessel.

12. The apparatus of claim 11, wherein said packing is corrugated plates.

13. The apparatus of claim 11, wherein the corrugated wall surfaces of said reaction vessel are hollow to permit passage of a heating medium therethrough.

14. The apparatus of claim 11, wherein the angles of the ridges of said corrugated surfaces progressively increase from the inlet to the outlet of said reaction vessel.

15. An apparatus for continuous polycondensation comprising a reaction vessel having at least one reaction unit, an inlet provided at the top of said reaction vessel for introducing reactant material into said reaction vessel, an outlet provided at the bottom of said reaction vessel for discharging the products of the polycondensation, heating means encompassing substantially the outer periphery of each of said reaction units, packing disposed in the reaction unit substantially parallel to the inner walls of said reaction unit, both the inner surfaces of said reaction unit and said packing having corrugated surfaces which are exposed to contact with the reactants, the angles of the ridges of said corrugated surfaces increasing, and the number of the ridges and furrows of said corrugated surfaces decreasing progressively from the inlet to the outlet of said reaction vessel, a header attached to said packing and having associated therewith a heat exchange means, at least one reaction material redistribution means disposed between said inlet and said outlet, a sparger pro- vided in the lowermost portion of said reaction vessel, a half-esterification unit communicating with said inlet, a dissolution tank communicating with said discharge outlet, and condenser means communicating with the reaction vessel near said inlet.

16. The apparatus of claim 15, wherein said packing is corrugated plates.

17. The apparatus of claim 15, wherein the corrugated wall surfaces of said reaction vessel are hollow to permit passage of a heating medium therethrough.

References Cited by the Examiner

UNITED STATES PATENTS

| 1,847,845 | 3/1932 | Mullen | 23—283 X |
| 3,044,993 | 7/1962 | Tiemersma | 23—283 X |
| 3,150,211 | 9/1964 | Murray et al. | 261—112 |

MORRIS O. WOLK, *Primary Examiner.*

JAMES H. TAYMAN, Jr., *Examiner.*